G. W. COMBS.
GYRATORY STRUCTURE.
APPLICATION FILED DEC. 29, 1908.
1,183,958.
Patented May 23, 1916.
2 SHEETS—SHEET 1.
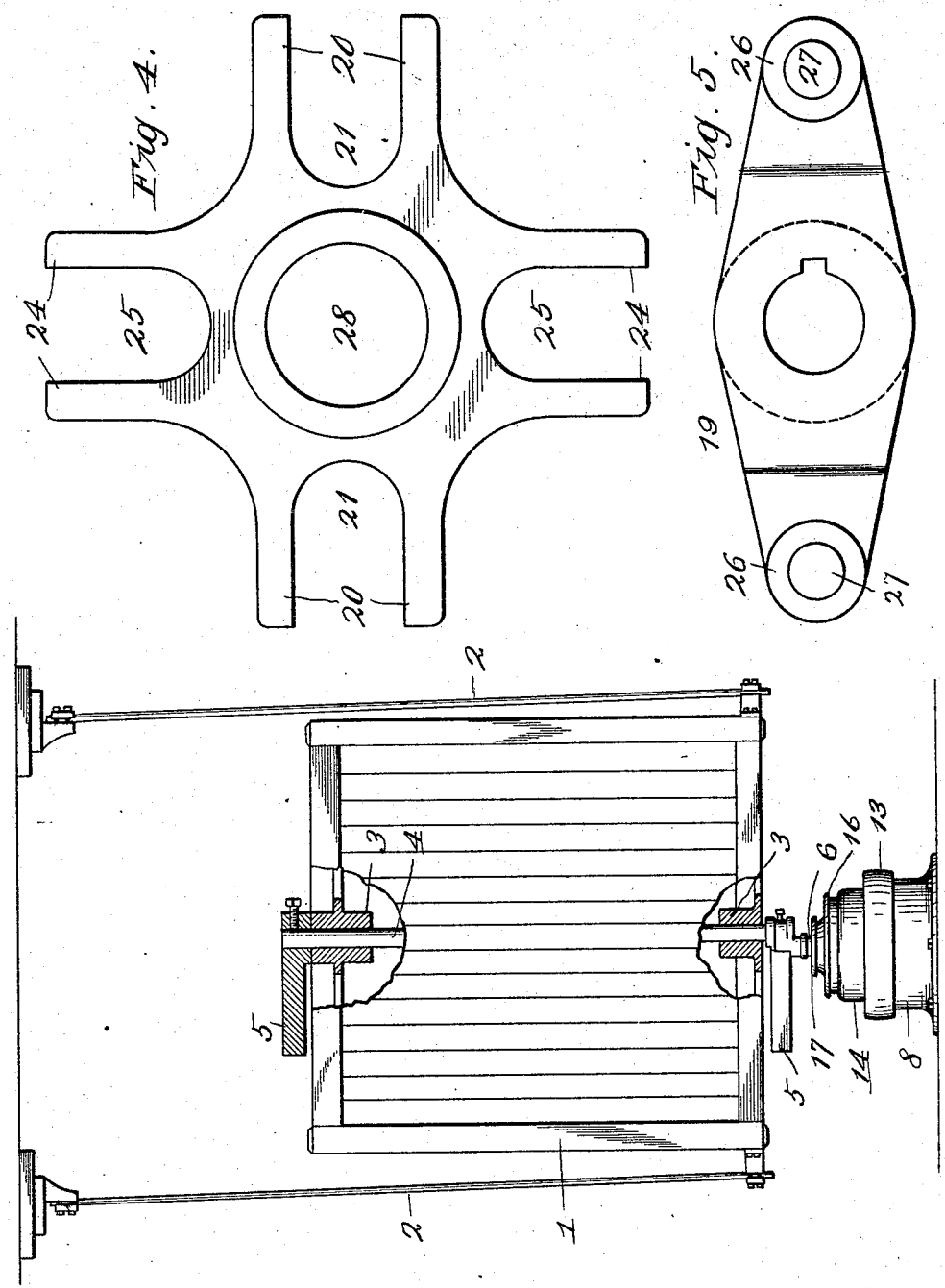
Witnesses:
Inventor,
George W. Combs,
By F. G. Fischer, Atty.

G. W. COMBS.
GYRATORY STRUCTURE.
APPLICATION FILED DEC. 29, 1908.
1,183,958.
Patented May 23, 1916.
2 SHEETS—SHEET 2.
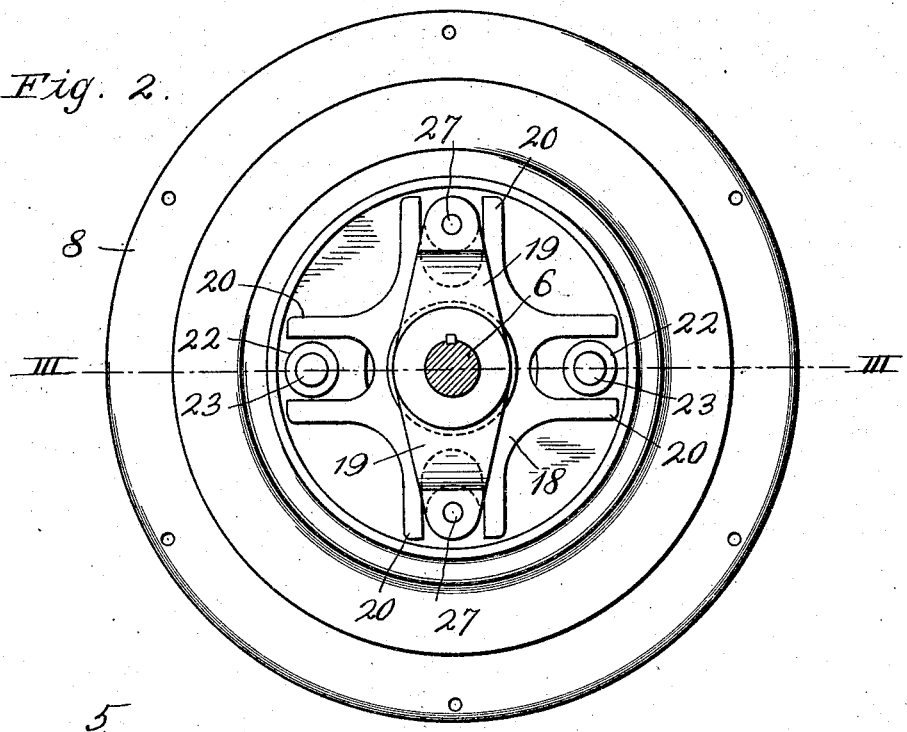
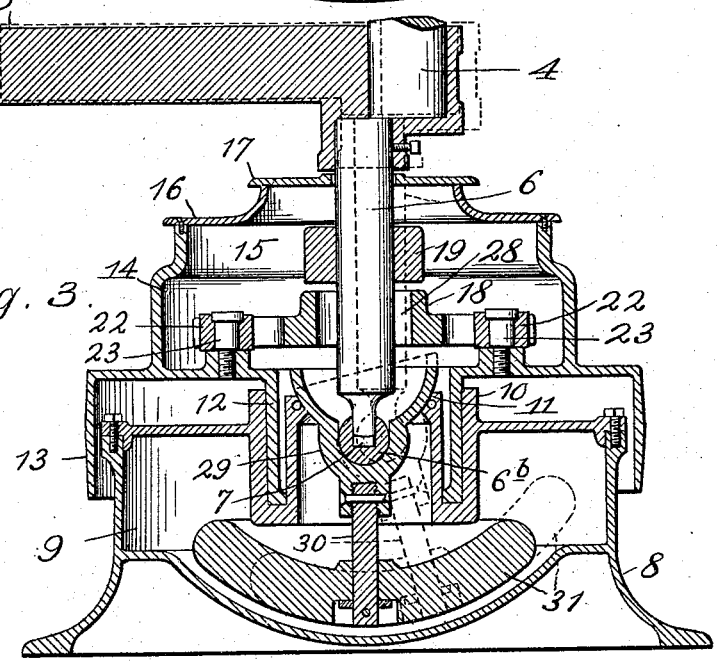
Witnesses:
R. Hamilton
Inventor,
George W. Combs,
By , Atty.

UNITED STATES PATENT OFFICE.

GEORGE W. COMBS, OF LEAVENWORTH, KANSAS.

GYRATORY STRUCTURE.

1,183,958.  Specification of Letters Patent.  Patented May 23, 1916.

Original application filed July 21, 1908, Serial No. 444,677. Divided and this application filed December 29, 1908. Serial No. 469,784.

*To all whom it may concern:*

Be it known that I, GEORGE W. COMBS, a citizen of the United States, residing at Leavenworth, in the county of Leavenworth and State of Kansas, have invented certain new and useful Improvements in Gyratory Structures, of which the following is a specification.

My invention relates to improvements in gyratory structures, such as flour-sifters, etc.; and it pertains more particularly to the novel driving mechanism of said structure.

Referring now to the accompanying drawings which illustrate the invention, Figure 1 shows an elevation of the structure provided with my improvements. Fig. 2 is a plan view of a pedestal and a yielding-coupling employed in carrying out the invention. Fig. 3 is a vertical section on line III—III of Fig. 2. Figs. 4 and 5 are details of the yielding-coupling forming part of the structure driving mechanism.

1 designates the gyratory structure, which in the present instance, is in the form of a sieve-box freely supported from the ceiling of the building by rods 2, so that it may gyrate. Said structure is provided with centrally-disposed bearings 3, in which a vertically-positioned drive-shaft 4 is journaled, said shaft being provided with eccentric weights 5, whereby a gyratory motion is imparted to the structure when the shaft is rotated.

6 designates a pin fixed eccentrically to the lower end of the shaft, but having its axis in alinement with the axis of rotation, so that the shaft will rotate around said pin and thus perform the function of a crank-shaft. Weights 5 are set a short distance from bearings 3, so that the shaft and the pin may move vertically to a limited extent with the restraining means hereinafter referred to. The lower end of pin 6 is preferably reduced in diameter and rests upon a block 7, arranged in the recess of a ball 6$^b$.

8 designates a pedestal fixed to an adjacent portion of the building and provided with a lubricant-chamber 9, a centrally-disposed step-bearing 10, and a concaved annular seat 11, which latter is arranged inside the bearing 10 and spaced a slight distance therefrom, so that the hollow hub 12 of a stationary driver 13, may be journaled in bearing 10, as shown in Fig. 3. Driver 13 has an upwardly-extending wall 14, forming a lubricant chamber 15, of which the hollow hub 12 forms a part thereof. Chamber 15, is closed at its upper end by a lid consisting of a stationary section 16 and a movable section 17, which latter is movable on the former, so that it may gyrate with the eccentric-pin 6.

Driver 13 transmits motion to the structure through the intermediacy of a yielding-coupling located in chamber 15, consisting of a lower transverse member 18 and an upper transverse member 19 arranged to move in a horizontal plane.

Member 18 is provided with a pair of diametrically-opposed arms 20, having open slots 21, to loosely receive a pair of diametrically-arranged antifriction-rollers 22, journaled on a pair of pins 23, projecting from driver 13. Member 18 is also provided with a pair of arms 24, arranged at right angles to arms 20 and provided with open slots 25, to loosely receive a pair of antifriction-rollers 26, mounted on pins 27, depending from the ends of member 19, which latter is keyed to pin 6, while member 18 has a large central opening 28, so that it may move freely without contacting with pin 6.

By interposing the yielding-coupling between the driver 13 and the sieve structure, the latter may gyrate to an abnormal extent without vibrating the building, because member 19 loosely engages member 18, and the latter member loosely engages the driver or its antifriction rollers 22.

In order to relieve the yielding-coupling of the weight of the shaft and the parts carried thereby, and also to overcome excessive throw of the structure, I provide a suitable restraining means of ordinary or preferred form. In the drawings I have shown restraining means consisting of independently-supported weight-controlled means having a universal connection with pin 6. Said means consists of a lever comprising a socket 29, in which ball 6$^b$, rests, and a rod 30. The upper portion of socket 29 fits snugly in seat 11, in which it is free to move in all directions, and it exerts a restraining influence on the structure through the intermediacy of a weight 31, secured to the lower end of rod 30.

While I have described the preferred construction of my invention, I of course do not wish to be limited to the exact form shown, but reserve the right to make such changes as properly fall within the spirit and scope of the appended claims.

Having thus described my invention, what I claim is:

1. In combination, a gyratory structure, a shaft therefor, a driver for said shaft, rollers carried by said driver, a member movably engaging said rollers, another member fixed to the shaft, and rollers carried by said last-mentioned member loosely engaging the first-mentioned member, said members and rollers forming a yielding-coupling whereby the shaft is driven by the driver.

2. In combination, a gyratory structure, a suitably supported shaft therefor, a driver for the shaft, a member fixed to the shaft, and another member loosely surrounding said shaft and provided with a plurality of arms loosely engaging the driver and the first-mentioned member, said members forming a yielding-coupling whereby the shaft is driven by the driver.

3. In combination, a gyratory structure, a shaft thereto, a stationary driver, and a yielding-coupling between said shaft and driver consisting of a transverse member fixed to the shaft, and a second transverse member loosely-surrounding the shaft and provided with two pairs of arms, one pair of said arms slidably-engaging the first-mentioned member and the other pair of arms slidably-engaging the driver.

In testimony whereof I affix my signature, in the presence of two witnesses.

GEORGE W. COMBS.

Witnesses:
E. R. THRELKELD,
F. G. FISCHER.

Copies of this patent may be obtained for five cents each, by addressing the "Commissioner of Patents, Washington, D. C."